Figure 1:
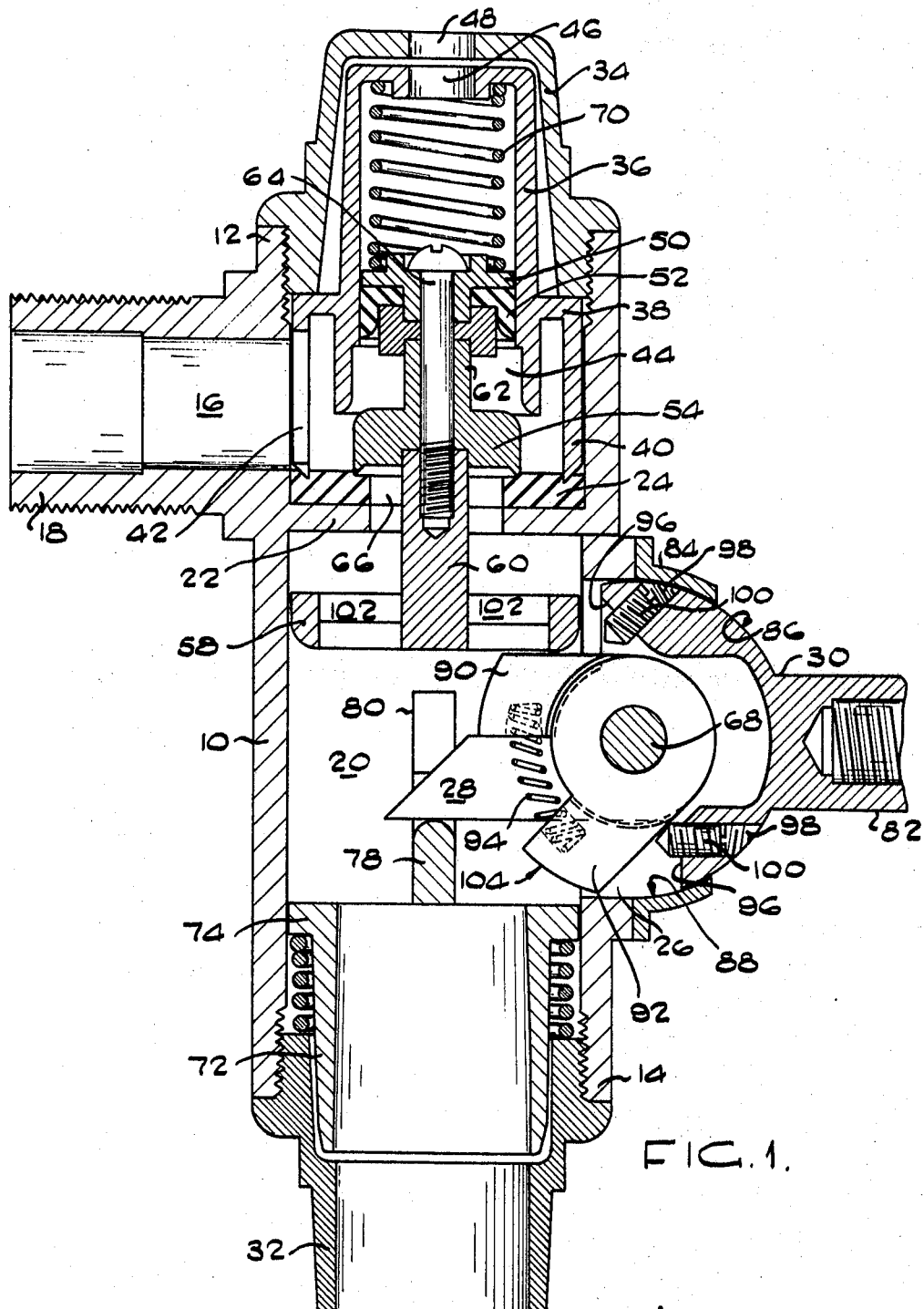

United States Patent

[11] 3,570,527

| [72] | Inventor | Salmon Gerhardus Antonie Fritz<br>Ficksburg, South Africa |
|---|---|---|
| [21] | Appl. No. | 782,692 |
| [22] | Filed | Dec. 10, 1968 |
| [45] | Patented | Mar. 16, 1971 |
| [73] | Assignee | Lokval (Proprietary) Limited<br>Pretoria, Transvaal, South Africa |

[54] FLOAT CONTROLLED VALVE
9 Claims, 2 Drawing Figs.

[52] U.S. Cl. .................................................. 137/421,
137/422, 137/426, 137/445
[51] Int. Cl. ......................................................... F16k 31/26
[50] Field of Search .............................................. 137/416,
418, 419, 420, 421, 422, 426, 434, 435, 443, 445;
251/75

[56] References Cited
UNITED STATES PATENTS
1,202,238  10/1916  Stokes ............................ 137/421

| 1,694,072 | 12/1928 | Manion ........................ | 137/445X |
| 1,885,424 | 11/1932 | Fischer ........................ | 137/420X |
| 2,328,323 | 8/1943 | Bowers et al. ................ | 137/445X |
| 3,401,717 | 9/1968 | Lamb ........................... | 137/421 |
| 3,406,711 | 10/1968 | Fogg ............................. | 137/445X |

Primary Examiner—William F. O'Dea
Assistant Examiner—David R. Matthews
Attorney—Karl W. Flocks

ABSTRACT: A float controlled valve having a displaceable valve element with a piston operative in a cylinder and both presenting differential areas for reaction thereon of the pressure of the fluid at the inlet, biassed means on the actuating lever to lock the valve against closing biassing means in the open position and providing rapid closing of the valve when retracted an auxiliary biassed means being also provided which, on release by means associated in the actuating lever, provides for rapid closing of the valve.

FLOAT CONTROLLED VALVE

BACKGROUND OF THE INVENTION

Float controlled valves are well known but these generally open and close at a slow rate. It is an object of this invention to provide a valve which opens substantially instantaneously in full bore when the controlling float reaches a predetermined lowered position whereas the closing is also substantially instantaneous.

FIELD OF THE INVENTION

THIS INVENTION relates to an improved valve and more particularly to a valve of which the opening and closing thereof is controlled by a float or other means attached to a lever extending from the valve.

According to the invention a float controlled valve includes a hollow body having an inlet and an outlet spaced from the inlet; a valve seat between the inlet and the outlet; a displaceable unit comprising a disclike valve element for sealingly seating on the inlet side of the valve seat, a piston in axially spaced relationship on the inlet side of the valve element, and an axially ported member in spaced relationship to the outlet side of the valve element and the valve seat; a cylinder in which the piston is sealingly slidable and in an end portion of which the valve element is retractable and from which said element is extended to sealingly engage the valve seat; a float operated actuating lever pivotally mounted on the body; and a biassed member associated with and movable within limits relative to the actuating lever and adapted to engage the ported member for displacement of the unit to open the valve and to maintain the unit in a position with the valve element off the valve seat and within the cylinder until the actuating lever has returned to substantially a normal position when the biassed member is displaced to release the unit for closing of the valve element; the arrangement being such that with the valve element off the valve seat the valve is open in full bore whereas the opening and closing of the valve is substantially instantaneous.

The collective cross-sectional areas of the ports of the ported member are substantially the same as the effective opening of the valve seat, but transverse face portions between the ports provide faces for reaction thereon of the fluid passing through the valve body to urge the valve element to the valve seat when the displaceable unit is free to move due to the retraction of the biassed member.

Biassing means is preferably provided for acting on the displaceable unit for forcing the valve element onto the valve seat while the opening of the valve is against such biassing means. The valve opening action, after initial lifting of the valve element off the valve seat, is assisted by fluid pressure acting on the piston.

Preferably an axially movable auxiliary member is provided adjacent the outlet of the valve body and biassed for movement towards and for engagement with the ported member of the displaceable unit. Said auxiliary member is engaged by the actuating lever for movement away from the ported member and against the biassing when the float is raised. Said biassed auxiliary member is held against its biassing by a further biassed member associated with the actuated lever until the float has receded to a predetermined extent when the biassed member is displaced for releasing the auxiliary member which may then strikingly engage the ported member for displacement of the valve element off the valve seat whereby substantially instantaneous full bore opening of the valve takes place.

The size of the piston is smaller than the valve element and provides differential areas for reaction thereon of the fluid pressure at the inlet of the valve and whereby the valve element is maintained in the closed position and also in the open position when retracted into the cylinder. Such fluid pressure is also utilized to assist displacement of the valve element to the open position after initial lifting the valve element off the valve seat by the action of the biassed member associated with the actuating lever and/or the biassed auxiliary member.

The biassed members, relatively movably associated with the actuating lever, comprise a pivoted pair of arms fulcrumed by an end portion on the pivot pin of the actuating lever and biassed away from one another in respect of free end portions. The pivoted arms are adapted to form struts to lockingly support the displaceable unit when the unit is in the valve open position and to hold the biassed auxiliary member in an ineffective position against the biassing of the latter. Only one of the pivoted arms can be operative at a time. The extent of movement of the arms away from one another and relative to the actuating lever is adjustable whereby the opening and closing of the valve may be arranged to take place for smaller or greater movements of the actuating lever.

The biassing means acting on the displaceable unit, auxiliary member and the arms associated with the actuating lever comprise compression springs.

For the invention to be clearly understood and carried into effect reference will now be made to the accompanying drawings, which illustrate an embodiment of the invention.

Figure 2:
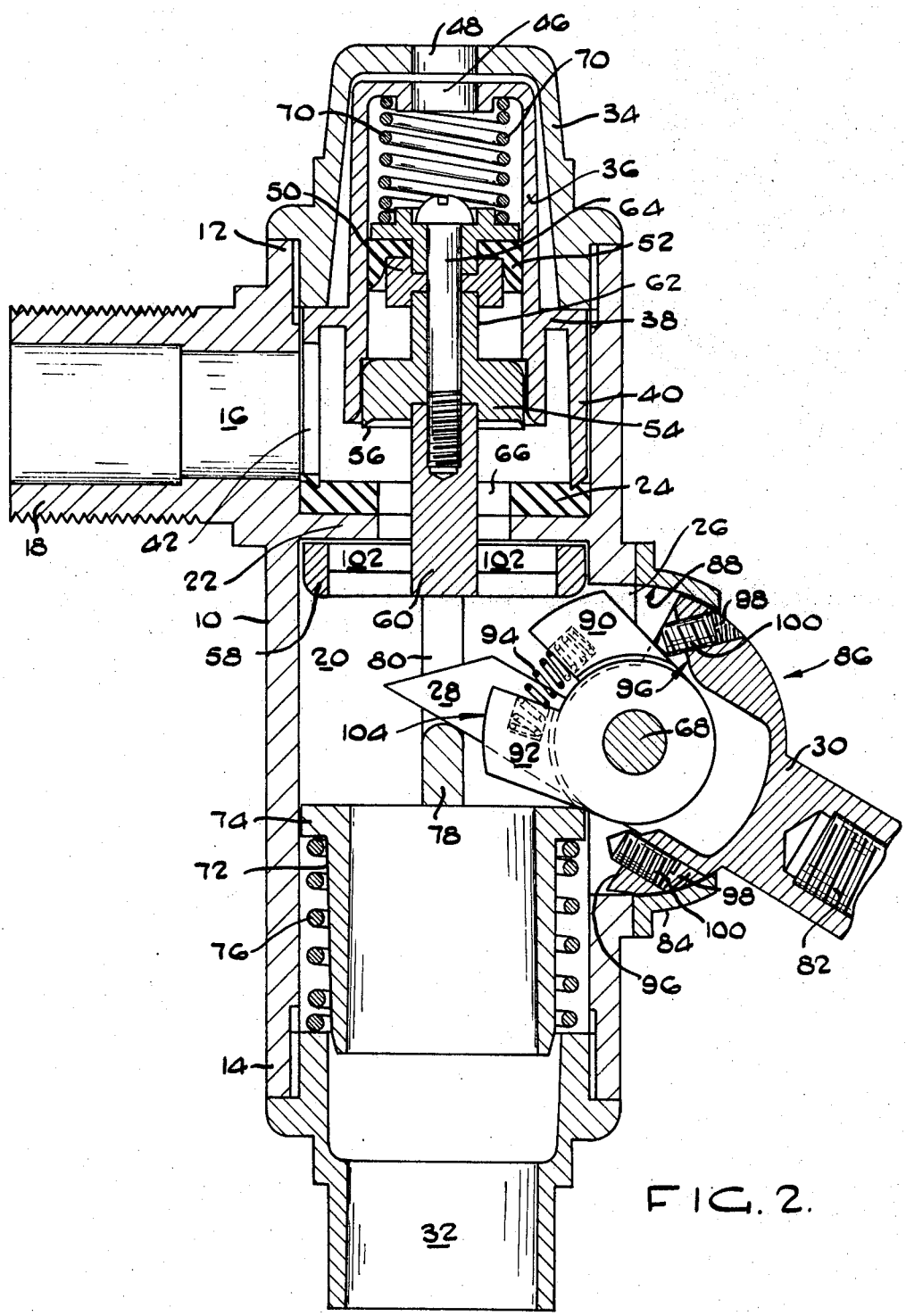

In the drawings:

FIG. 1 is a vertical cross section of a float controlled valve constructed according to the invention and shown in the closed position; and FIG. 2 is a view similar to FIG. 1, showing the valve in the open position.

In the form of the valve shown, a hollow substantially cylindrical valve body 10 is provided having an internally screw threaded open top end 12 and a similar open bottom end 14. Adjacent the top end 12 a radially extending inlet 16 is provided having a screw-threaded tubular extension 18 for attachment of a fluid supply pipe (not shown). Internally of the bore 20 of the valve body 10 a transverse annular shoulder 22 is provided on which a resilient material flat ringlike valve seat 24 is supported. In the side of the casing substantially diametrically opposite to the inlet 16 an opening 26 is provided through which the load arm 28 of an actuating lever 30 extends. In the bottom end 14 of the valve body 10 an outlet forming tubular part 32 is screwed.

In the top end 12 of the valve body 10 a cap 34 is screwed while within the cap 34 and the top portion of the valve body a cylinder forming element 36 is located. The element 36 is provided at an intermediate region with a radial shoulder forming flange 38 from the periphery of which an axial flange 40 extends which is adapted to engage on the valve seat 24 to press and hold the latter on the shoulder 22. In the axial flange 40 a port 42 is provided which is adapted to be disposed in alignment with the inlet 16. The axial flange 40 extends beyond the bottom end of the cylinder 36. The bottom end portion of cylinder 36 is of increased bore as at 44. In the closed ends of the cylinder 36 and the cap 34 holes 46 and 48 respectively are provided for communication with the atmosphere.

Within the cylinder 36 a piston 50 is provided which includes a circumferentially flanged resilient sealing cup 52. Axially spaced below the piston 50 is a valve element 54.

The valve element 54 is of slightly greater diameter than the piston 50. The seat engaging portion of the valve element 54 provides an axially protruding rim 56.

Axially below the valve element 54 an axially parted member 58 is provided. The piston 50, valve element 54 and the parted member 58 are arranged coaxially and in axial spaced relationship. Stem or shank 60 of the ported member 58 and shank 62 of the valve element 54 engage in central recesses of the valve elements 54 and the piston 50 for axial alignment. The piston 50, valve element 54 and the ported member 58 are rigidly connected together by an axial screw 64 to form a rigid but axially movable unit. The stem 60 of the ported member 58 extends with wide clearance through the hole 66 of the valve seat 24 and is disposed on the outlet side of the shoulder 22 and above the axis of a pivot pin 68 of actuating lever 30.

In the upper part of the cylinder 36 a compression spring 70 is disposed which pressingly engage with its opposite ends on the piston 50 and the top of the cylinder 36.

In the lower portion of the valve 10 an axially movable tubular auxiliary member 72 is disposed having at the top a radial flange 74. Around the member 72 a compression spring 76 is provided which bears with its top end against the under face of the flange 74 and with the bottom end on the outlet forming part 32. The tubular member 72 is provided across its top with a diametrical bar forming part 78 having on the end regions upwardly and axially directed rigid arms 80.

The actuating lever 30 provides a screw threaded socket 82 into which the float carrying effort arm is screwed. The effort arm and the float, which are of known construction, are not shown. The actuating lever 30 is pivotally mounted about the horizontal pivot pin 68 which is carried on one side of the valve body 10 and may be clamped in position by a bracket part 84. The actuating lever, at the position of the pivot pin, provides a substantially semicircular face portion 86 which is movable, with small clearance within a complementary curved inner face 88 of the bracket 84 to substantially prevent leakage of the fluid. The load arm portion 28 of the actuating lever 30 is bifurcated and extends into the valve body and across the diametrical bar 78 of member 72.

Between the bifurcated parts of the load arm 28, and pivotally carried on the pivot pin 68, are a pair of short arms 90 and 92 of which the free ends are of curved shape. Between the arms a compression spring 94 is disposed which tends to force the arms 90, 92 away from one another. The semicircular portion 86 of the actuating lever 30 presents shoulders 96 and tapped holes 98 substantially perpendicularly to the shoulders. In said tapped holes 98 set screws 100 are engaged and which form adjustable stops for the arms 90, 92 and limit the extent of outward swinging of such arms.

In the raised position of the unit, comprising the connected piston 50, valve element 54, and ported member 58, the valve element 54 is located within the larger bottom portion 44 of the cylinder 36 while the ported member 58 is located immediately below the shoulder 22.

In operation the fluid, under pressure, enters the valve body through the inlet 16 and flows through the hole 66 of valve seat 24, the ports 102 of the ported movable member 58, the cylindrical member 72 and the outlet 32. The spring 70 produces a downward pressure on the piston 50, valve element 54 and ported member 58 unit but arm 90, which is slapingly upwardly disposed, blocks downward movement of the unit by virtue of a portion of the rim of the member 58 resting on the arm 90. The arm thus forms a strut. Furthermore, the spring 76 also presses the unit in an upward direction due to the engagement of the arm 80 on the ported member 58.

As the liquid level in a tank, into which the valve discharges, increases, the actuating lever 30 is rotated in an anticlockwise direction due to the raising of the float. The extension 28 of the actuating lever 30, which engage the diametrical bar 78, forces the member 72 downwardly against the action of the spring 76 on forced anticlockwise rotation of the actuating lever. When the float has reached a certain elevated level, the upper set screw 100 engages the arm 90 and causes it also to rotate in the anticlockwise direction. Arm 92 then engages a top edge portion of the member 72 and maintains such position due to pressure by compression spring 94. When the arm 90 has moved from below the member 58 the member 72 has moved beyond the reach of the arm 92 and as a result of which the arm 92 swings to the position as shown in FIG. 1 for its curved outer end surface 104 to be disposed substantially transversely across a portion of the upper rim of the member 72. When the arm 90 has moved to a sloping position, and when no longer acting as a strut below the member 58, the compression spring 70 causes the piston, valve member and ported member unit to move rapidly downwardly and which movement is assisted by fluid pressure on the upper face of the valve element 54. On seating of the valve element 54 on the seat 24 the valve is closed and the fluid pressure on the upper face of valve element 54 assists in holding it in the closed position.

As fluid is drained from the tank and the float moves downwardly, free clockwise swinging of the actuating lever 30 takes place until the lower set screw 100 engages the arm 92, which in the meantime has been engaged by the upwardly moving member 72, and forms a strut preventing further upward movement of the member 72. When the pressure of the set screw 100 on the arm 92 becomes a maximum, due to substantially the total weight of the float and load arm, the arm 92 is displaced inwardly. The spring 94 reacts on the member 58 through arm 90 to force member 58 upwardly. The member 72 is then simultaneously released and is forced upwardly by its spring 76 for the arms 80 to engage the ported member 58. The piston, valve element and ported member unit is thereby forced rapidly upwardly for opening of the valve. During this action, the spring 94 has forced arm 90 to the steeply inclined position as is shown in FIG. 2 to prevent downward movement of the valve element until the actuating lever has again been rotated in the anticlockwise direction for the upper set screw 100 to engage arm 90.

The valve is preferably mounted with its axis vertically.

The opening of the valve takes place when the float reaches substantially its lowermost position while the closing takes place when the float approaches a maximum raised position and in which case the actuating lever is preferably substantially horizontally.

By adjusting the screws 100 to increase or decrease their extends of projection from the shoulders 96 the opening and closing of the valve may take place at different positions of the float.

The valve according to the invention may, however, be operated by means other than the float.

The invention is particularly suitable for use in lavatory cisterns, animal drinking troughs or the like and may operate under high or low liquid supply pressures.

I claim:

1. A float controlled valve which includes a hollow body having an inlet and an outlet spaced from the inlet; a valve seat between the inlet and the outlet; a displaceable unit comprising in axial spaced relationship a disclike valve element for sealingly seating on the inlet side of the valve seat, a piston on the inlet side of the valve element, and a ported member on the outlet side of the valve element and the valve seat; a cylinder in which the piston is sealingly slidable and in an end portion of which the valve element is retractable and extendable to engage the valve seat; a float operated actuating lever pivotally mounted on the valve body; and a biassed member associated with and movable within limits relative to the actuating lever and adapted to engage the ported member for displacement of the unit to open the valve and to maintain the unit in a position with the valve element off the valve seat and within the cylinder until the actuating lever has returned to substantially a normal position when the biassed member is displaced for release of the unit and closing of the valve: the arrangement being such that with the valve element off the valve seat the valve is open in full bore whereas the opening and closing of the valve is rapid.

2. A float controlled valve as claimed in claim 1 wherein the piston and the valve element are provided with differential areas for reaction thereon of fluid pressure at the inlet of the valve to assist in the opening and closing actions while spring means is provided acting on the unit biassing the valve element towards and onto the seat.

3. A float controlled valve as claimed in claim 2 wherein an auxiliary movable member is provided adjacent the outlet of the valve body and biassed for movement towards and into engagement with the ported member of the displaceable unit, said auxiliary member being engageable by the actuating lever for movement away from the ported member and against the biassing on raising of the float and whereby the auxiliary member moves away from the ported member, said auxiliary member being held against its biassing by a biassed member associated with the actuating lever until the float has receded to a predetermined extent when the biassed member is displaced for releasing the auxiliary member to strikingly engage the ported member for instantaneous displacement of the valve element off the valve seat.

4. A float controlled valve as claimed in claim 3 wherein the biassed members, relatively movably associated with the actuating lever, comprise a pair of arms each fulcrumed by an end on a pivot pin of the actuating lever and biassed away from one another in respect of free end portions by spring means, the pivoted arms being adapted to form struts to blockingly hold the displacable unit in the displaced and valve open position and to hold the biassed auxiliary member in an ineffective position by faces on their free ends when disposed across portions of the ported member and the auxiliary member respectively, the extent of movement of the arms away from one another and relative to the actuating lever being adjustable whereby the opening and closing of the valve can take place for smaller or greater movement of the actuating lever.

5. A float controlled valve as claimed in claim 4 wherein the adjustable means controlling the extent of movement of each of the arms comprise screw devices engageable in screw threaded holes in shoulder formations of the actuating lever at positions radially spaced from the pivot axis of the actuating lever and the arms.

6. A float controlled valve as claimed in claim 5 wherein the actuating lever provides a pair of parallel spaced extensions projecting into the valve body and between which the pivoted arms are pivotally disposed, said extensions forming a load arm adapted to engage a transverse bar across an inwardly directed end of the auxiliary member for displacement of such member away from the ported member and against the biassing of the auxiliary member.

7. A float controlled valve as claimed in claim 1 wherein the collective cross-sectional areas of the ports in the ported member are substantially the same as the effective opening of the valve seat whereas transverse face portions of said member provide reacting faces for fluid passing through the valve body to assist in the substantially instantaneous closing of the valve when the movable unit is free to move to the closed position of the valve element.

8. A float controlled valve as claimed in claim 1 wherein the cylinder for the piston is removably mounted within the valve body and axially aligned and spaced from the inlet side of the valve seat, and end of the cylinder directed away from the valve seat being open to the atmosphere whereas within the cylinder a compression spring is provided acting between a radial shoulder across the cylinder and the piston, said piston providing an annular cupped seal slidably engageable with said cylinder.

9. A float controlled valve which includes a hollow body having an inlet and an outlet spaced vertically from the inlet; an annular valve seat between the inlet and the outlet; a displaceable unit comprising in axially spaced relationship a disclike valve element sealingly seatable on the inlet side of the seat, a piston on the inlet side of the valve element, and a vertically ported member in spaced relationship to the outlet side of the valve element and the valve seat; a cylinder spaced relative to the valve seat and in which the piston is sealingly slidable and in an enlargement of the bore at the inwardly directed end portion of which the valve element is retractable and from which said valve element is extended to sealingly engage the valve seat; a compression spring within the cylinder engaging on a flange at the outer end of the cylinder and the piston and providing a closing bias on the valve element; a float operated actuating lever pivotally mounted on the body; a first arm pivotally associated with and movable within limits relative to the actuating lever and adapted to engage the ported member to assist in opening of the valve on receding of a float associated with the actuating lever and also to maintain, strut wise, the unit in a position with the valve element off the valve seat and within the cylinder until the actuating lever has returned to substantially a normal position when the arm is displaced to release the unit for closing of the valve; a spring biassed auxiliary member at the outlet adapted to effect opening of the valve when released and retractable by the actuating lever against its biassing when the lever returns to the normal position; a second arm pivotally associated with the actuating lever and movable within limits relative thereto and adapted to engage the auxiliary member and retain the latter, strut wise, against the action of the compression spring for displacement and release when the float approaches a lowered position; projecting arms on the auxiliary member adapted to strikingly engage the ported member for rapid displacement of the unit and opening of the valve on release of said member; and a compression spring acting between the arms biassing them away from one another and towards stops on the actuating lever: the arrangement being such that rapid closing and rapid full bore opening of the valve is provided when the float reaches the normal and the lowered positions.